United States Patent [19]

Ozawa

[11] Patent Number: 4,500,927
[45] Date of Patent: Feb. 19, 1985

[54] ORIGINAL READING DEVICE

[75] Inventor: Takashi Ozawa, Kanagawa, Japan

[73] Assignee: Fuji Xerox Co., Ltd., Tokyo, Japan

[21] Appl. No.: 459,557

[22] Filed: Jan. 20, 1983

[30] Foreign Application Priority Data

Jan. 22, 1982 [JP] Japan .................................. 57-7457

[51] Int. Cl.³ .................... H04N 1/10; H04N 5/21; H04N 1/40; H04N 1/02
[52] U.S. Cl. .................................. 358/293; 358/167; 358/212; 358/284; 358/294; 357/24
[58] Field of Search ............... 358/166, 167, 212, 213, 358/284, 293, 294; 357/24 LR

[56] References Cited

U.S. PATENT DOCUMENTS

| 4,045,817 | 8/1977 | Nakatani et al. | 358/213 |
| 4,109,284 | 8/1978 | Tompkins | 358/212 |
| 4,145,721 | 3/1979 | Beaudouin et al. | 358/213 |
| 4,335,405 | 6/1982 | Sakane et al. | 358/213 |
| 4,419,696 | 12/1983 | Hamano et al. | 358/293 |
| 4,424,590 | 1/1984 | Ozawa | 358/293 |
| 4,449,147 | 5/1984 | Ogasawara | 358/293 |

Primary Examiner—Howard W. Britton
Assistant Examiner—John K. Peng
Attorney, Agent, or Firm—Sughrue, Mion, Zinn, Macpeak and Seas

[57] ABSTRACT

An original reading device comprising a plurality of light sensing elements connected to output signal lines via MOS transistors. A row of light sensing elements is divided into blocks of elements. Each block has a pair of signal output lines. Groups of consecutive MOS transistors are alternately connected to the two signal lines, each group comprising at least two MOS transistors. The transistors are turned on twice each reading cycle, the time between turn-on of a given MOS being sufficiently short so that the output signal contains only noise, as compared to the photosignal plus noise obtained during the first turn-on. The turn-on sequence is such that the first turn-on of any group coincides with the second turn-on of the preceeding group. The signal output lines are connected as the inputs of a differential amplifier. Thus the noise signals are subtracted from the photosignal plus noise signals to result in outputs having only photosignals.

4 Claims, 9 Drawing Figures

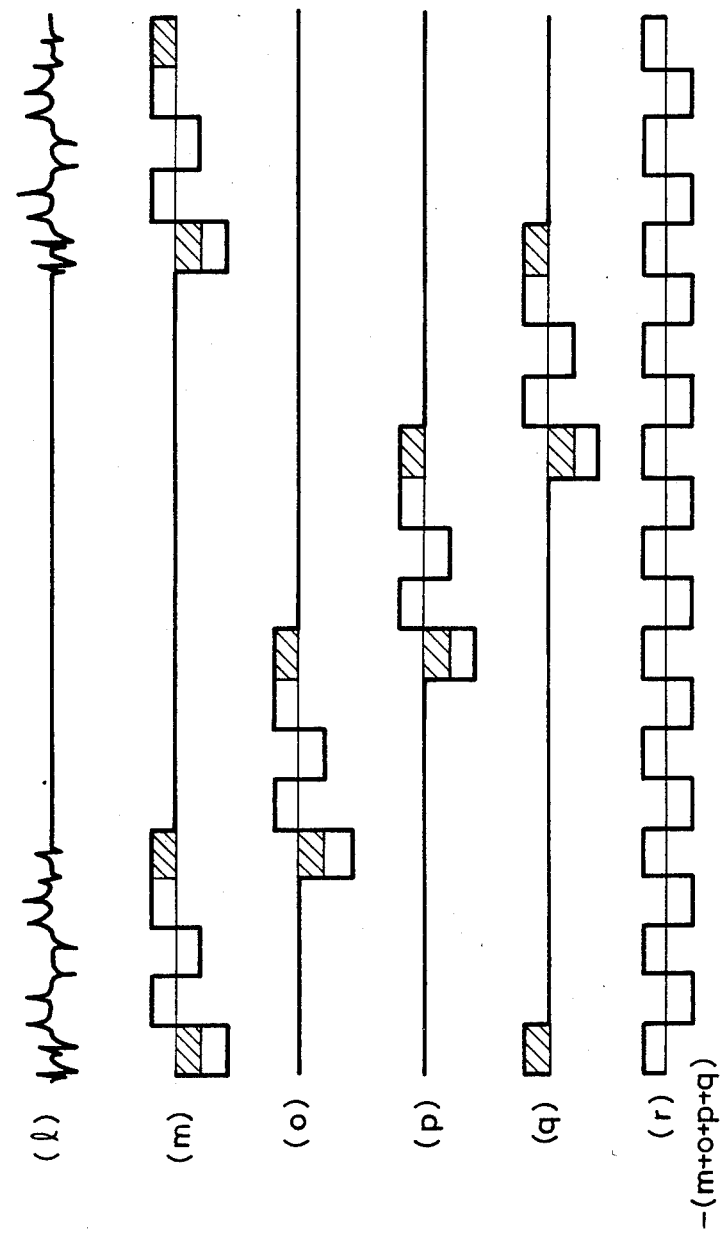

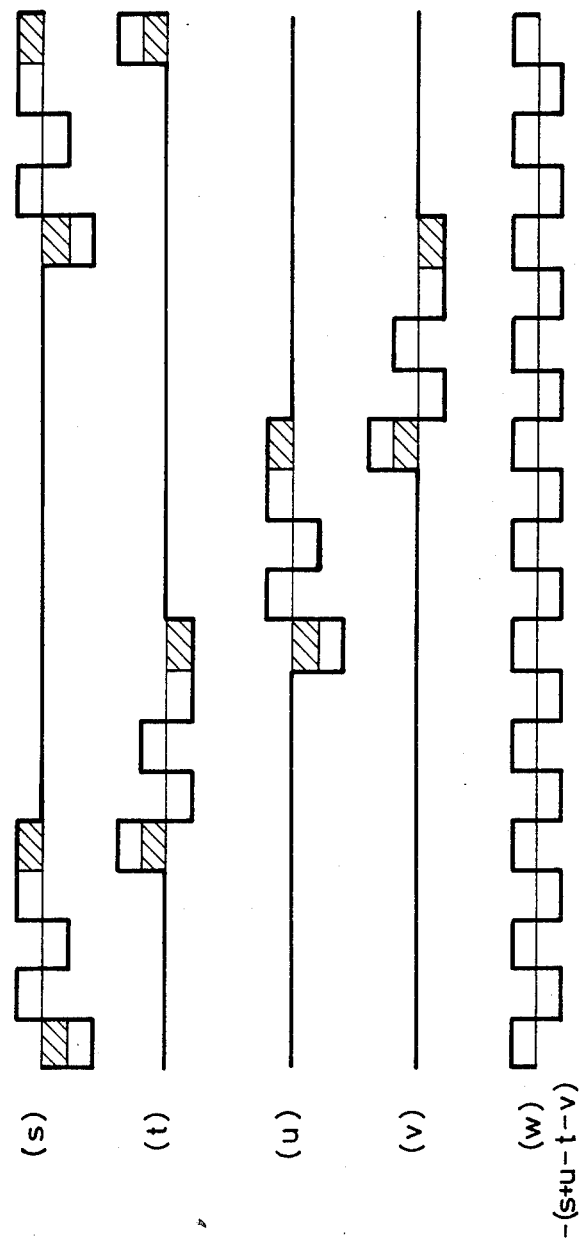

ORIGINAL READING DEVICE

FIELD OF THE INVENTION

The present invention relates to an original reading device for use in a facsimile system and other optical equipment. More particularly, the invention relates to a large-scale image sensor that has recently been developed as a replacement for an MOS photodiode array or CCD image currently used in original reading devices.

BACKGROUND OF THE INVENTION

An original reading device (hereunder referred to as a large-scale image sensor) comprises an insulating substrate, a plurality of photoelectric transducers formed on the substrate, and a circuit for switching and scanning the transducers. The circuit is either formed on the substrate or attached to another substrate. The sensor uses an optical fiber array or lens array to read the original, so the length of the optical path for image forming can be decreased to reduce the scale of the reading device by a considerable degree.

The driving circuit of the conventional large-scale image sensor and its construction are shown in FIGS. 1(a) and 1(b), and a cross-section of FIG. 1(b) taken on the line A—A' is shown in FIG. 1(c). A light receiving element generally indicated at 5 comprises a substrate 1 supporting a thin photoconductive film 3 sandwiched between discrete electrodes 2, made of a thin conductive film, and a continuous electrode 4 made of a thin transparent conductive film. An equivalent circuit of the light receiving element consists of a photodiode PD and a capacitor CD in parallel.

A shift register 8 turns on MOS transistors $7_1$ to $7_n$ sequentially, and a bias supply 10 charges light receiving elements $5_1$ to $5_n$ to some maximum voltage. In between charging, the voltage across the capacitor CD reduces depending on the quantity of light falling on the element 5, i.e. The capacitor CD is discharged by the photodiode PD whose conductivity depends upon the light intensity. During the next cycle, when shift register 8 turns on the transistors $7_1$–$7_n$, the capacitors CD are charged back to the maximum voltage. The amount of charge required to fully charge each capacitor CD is a measure of the light intensity on the photodiodes between charging cycles. The charging signal is picked up on line 12 as a video signal by a load resistor 9 and constitutes an output signal of the array. In short, a recharging current flows in the area where discharging has occurred due to illumination, and no recharging current flows in the black area where no discharge has taken place. Each resolvable spot is known as a pixel, which is short for picture element.

A light receiving element having a pixel density of, say, 8 dots/mm and a length equal to the size of the original (210 mm) is formed on the insulating substrate 1. The MOS transistors $7_1$ to $7_n$ and the shift register 8 are packed in an integrated switching circuit 6 which is mounted on the substrate 1 and connected to the element 5 by wire bonding 11 or other suitable means.

The conventional arrangement described above requires a very long signal line 12 which causes the following disadvantages. First, noise is induced in the signal line 12 to reduce the S/N ratio considerably. Typical noises are clocked noise accompanying the driving of the shift register 8 and spike noise that enters from the gates of the MOS transistors $7_1$ to $7_n$. Secondly, increased parasitic capacitance 13 on the signal line 12 increases the CR time constant in the reading circuit and decreases the sharpness of the waveform of the charging current, thereby decreasing the reading speed. The parasitic capacitance 13 is the sum of the stray capacitance on the signal line 12 and the source-ground capacitance of the MOS transistors $7_1$ to $7_n$ and it increases with the increase in the length of the signal line 12 and the number of MOS transistors connected to the line. Because of these disadvantages, the requirements of high-speed reading and low power consumption have not been met by the conventional large-scale image sensor.

RELATED APPLICATIONS

The subject matter described herein is related to the subject matter described in an application of the same assignee filed on the same date as this application and entitled, "Signal Processing Unit for Original Reading Device".

SUMMARY OF THE INVENTION

Therefore, the primary object of the present invention is to provide a large-scale image sensor that is free from the defects of the conventional product and which is capable of high-speed reading with reduced noise and hence increased S/N ratio. The present invention is an improvement of the original reading device described in the co-pending Japanese Patent Application filed on November 13, 1982.

The large-scale image sensor of the present invention comprises a plurality of reading devices each consisting of a reading element and a circuit for driving it, wherein two signal lines are provided for connection to the MOS transistor, two or more adjacent MOS transistors being connected to the same signal line with the next group of two or more MOS transistors connected to the alternate line. Each MOS transistor is switched twice, once for producing a signal and a second time for producing noise. The outputs from the two signal lines are subjected to differential amplification. Each pair of signal lines is connected to a differential amplifier, and the output from each amplifier is sent to an operational amplifier that produces an output that is picked up as a readout signal.

BRIEF DESCRIPTION OF THE DRAWINGS

FIG. 5 is a timing chart showing the operational sequence of the circuit of FIG. 4;

FIG. 7 is a timing chart showing the operational sequence of the circuit of FIG. 6.

DETAILED DESCRIPTION OF THE INVENTION

Figure 2:
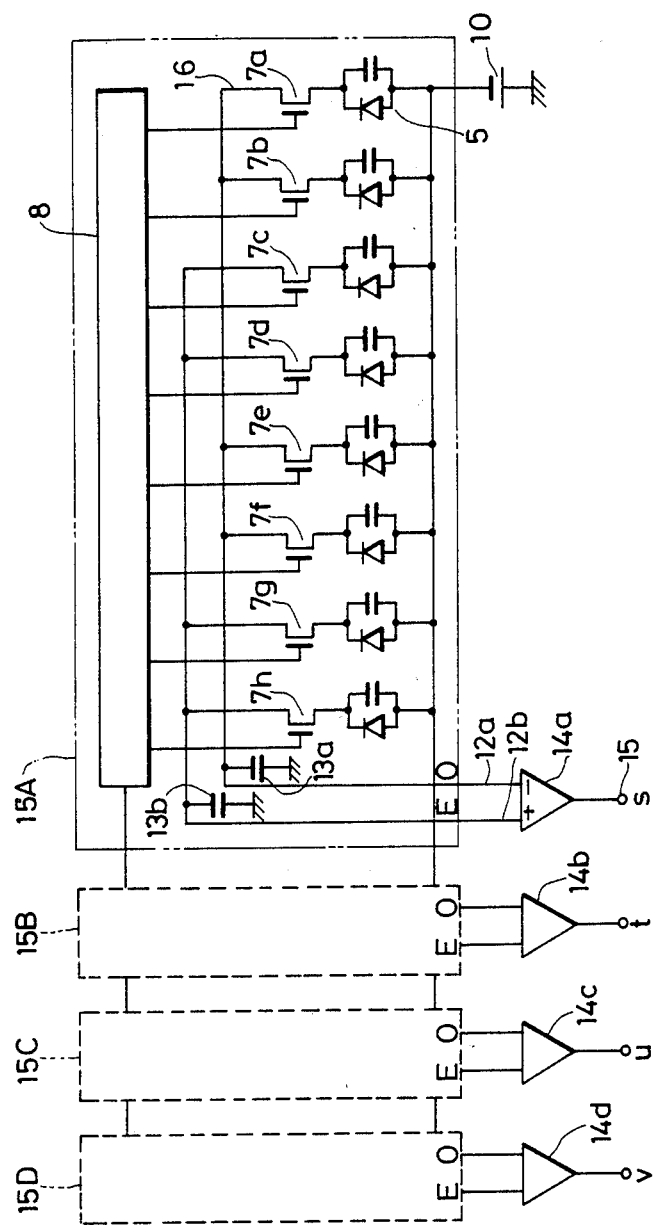
FIG. 2 is an equivalent circuit of a large-scale image sensor in accordance with the present invention.

A preferred embodiment of the image sensor of the present invention will be described with reference to FIG. 2, wherein a plurality of image sensors each comprising a light receiving element 5, MOS transistors 7a to 7h, and a shift register 8 are divided into a suitable number of blocks, e.g., four blocks, 15A, B, C and D. Each block has two signal lines 12a and 12b. At least two adjacent transistors have their sources connected to the same signal line and form a group of transistors. Alternate groups have their sources connected to alternate signal lines, every group consisting of at least two or more consecutively positioned transistors. In FIG. 2 each group consists of two MOS transistors and four groups are shown in block 15A. However, the number of transistors per group and the number of groups can be increased.

Figure 3:
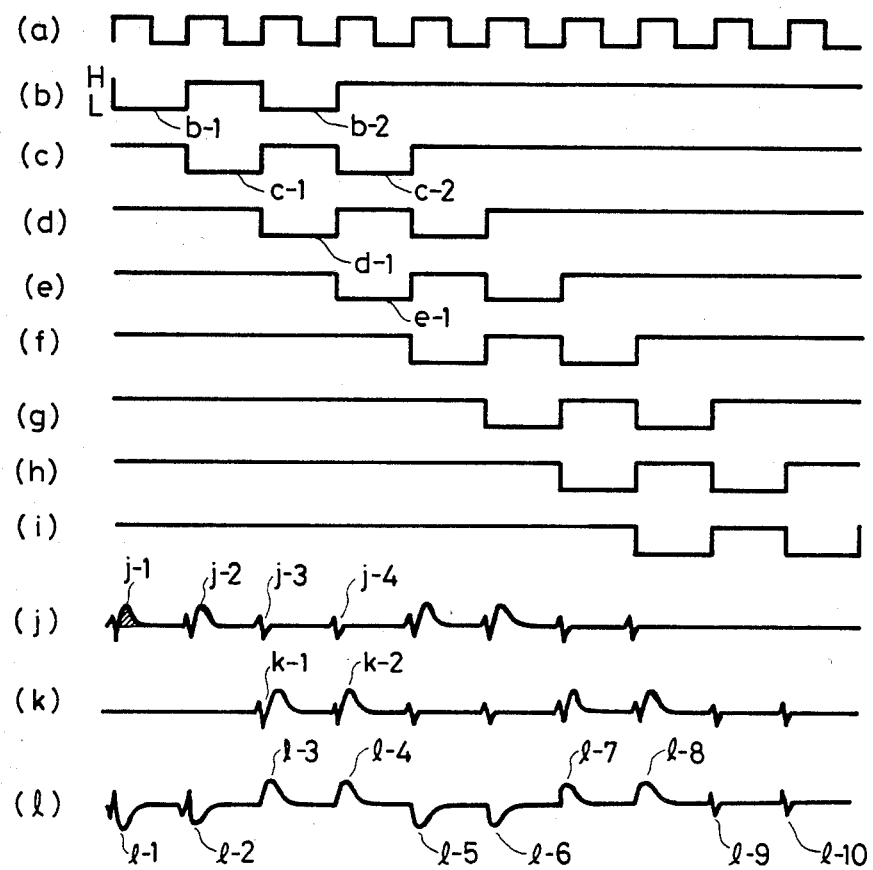
FIG. 3 is a timing chart showing the operational sequence of the image sensor of FIG. 2.

FIG. 3 is a timing chart showing the operational sequence of the part of the image sensor in block 15A. Signal a is a clock for driving the shift register 8. Signals b to i are the timing signals to be applied to the gates of the MOS transistors 7a to 7h, respectively, by the shift register 8. The transistors are turned on at level "L" and turned off at level "H". First, low-level signals b and c are consecutively supplied to produce pulses b-1 and c-1 that turn on the MOS transistors 7a and 7b sequentially. This results in signal j on signal line 12a which is a mixture of a photosignal and noise as shown by pulses j-1 and j-2. The hatched area of pulse j-1 corresponds to the photosignal. Subsequently, low-level signals d and e are consecutively supplied to produce pulses d-1 and e-1 that turn on the MOS transistors 7c and 7d sequentially. This results in signal k on signal line 12b which is a mixture of photosignal and noise as shown by pulses k-1 and k-2. Simultaneously with this second step, low-level signals b and c are supplied sequentially to produce pulses b-2 and c-2 that turn on the MOS transistors 7a and 7b again. In other words, the switching circuit operates as if it were a ring counter. Since the interval between switching by pulses b-1 and c-1 and that by pulses b-2 and c-2 is very brief, the quantity of photosignals accumulated in the light receiving element 5 is negligible and signal j containing substantially only noise is fed to the signal line 12a as shown by pulses j-3 and j-4. By effecting the same operation on signals d, e, f, g, h and i, signals as indicated by j and k are subjected to differential amplification in a differential amplifier 14a which is connected to the signal lines 12a and 12b. The noise component is cancelled and a signal containing substantially only the photosignal as shown by pulse l-3 to l-8 is sent to the amplifier output 15. As shown, pulses l-5 and l-6 from signal line 12a are inverted, and this is because that line is connected to the inverting input of the amplifier 14a. pulses l-1, l-2, l-9 and l-10 still contain noise but that noise is eliminated by subsequent processing as described hereunder.

Figure 1A:
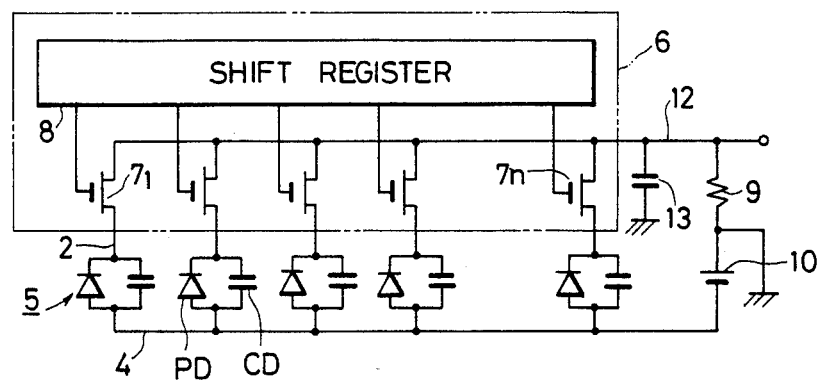
FIG. 1(a) is an equivalent circuit diagram of a conventional large-scale image sensor.
Figure 1B:
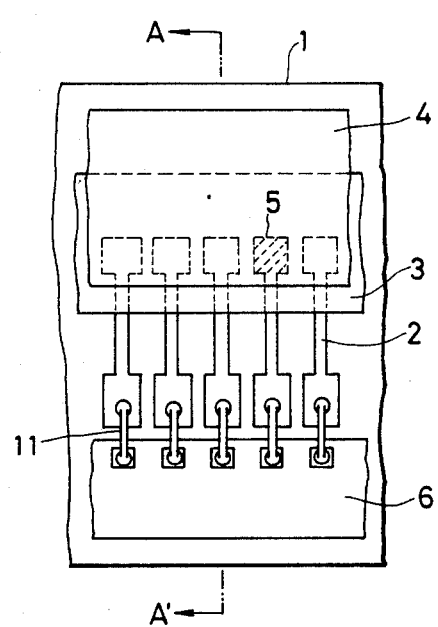
FIG. 1(b) is a plan view showing the construction of the image sensor of FIG. 1(a)
Figure 1C:
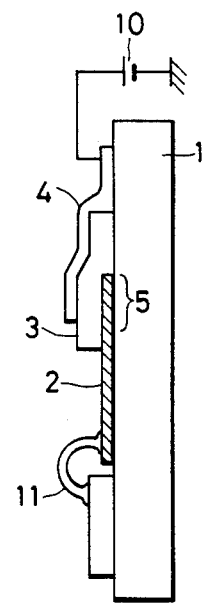
FIG. 1(c) is a cross-section of FIG. 1(b) taken on the line A—A'.

The parasitic capacitance 13a and 13b on signal lines 12a and 12b in FIG. 2 is considerably smaller than the parasitic capacitance 13 in FIG. 1 and this is due to the dividing of the image sensors into several blocks. If the sensors are divided into four blocks (15A, 15B, 15C and 15D) as shown in FIG. 2 wherein the sources of four MOS transistors are connected to one signal line, the parasitic capacitance 13a and 13b is at least one eighth as small as the parasitic capacitance 13 of FIG. 1(a), assuming the same number of MOS transistors in the image sensor. The small parasitic capacitance greatly reduces the time constant of the reading circuit and hence contributes to high reading speed.

Figure 4:
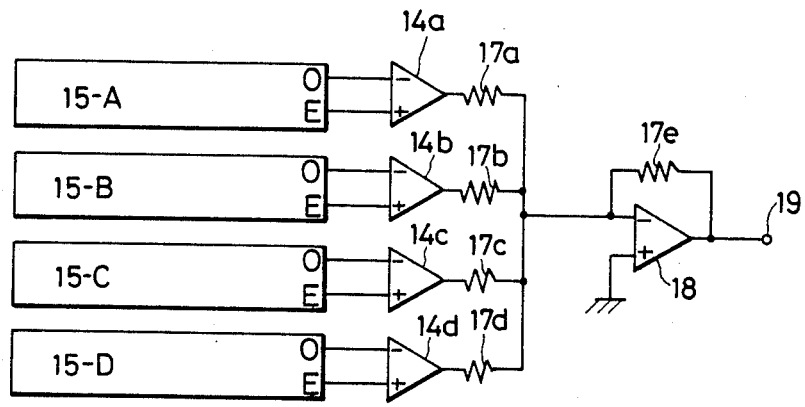
FIG. 4 is a signal processing circuit used for the image sensor of the present invention.

FIG. 4 shows an embodiment of the signal processing circuit used in the image sensor of FIG. 2. Signal lines 12a and 12b are sent out to points O and E, respectively, in blocks 15A to 15D. The outputs from O and E are connected to the inverting input and noninverting input, respectively, of each of the differential amplifiers 14a to 14d, and the outputs from the amplifiers 14a to 14d are summed by an adder circuit comprising resistors 17a to 17e and an operational amplifier 18, and the resulting sum is sent to an output 19.

The sequence of signal processing by the circuit of FIG. 4 will be described with reference to the timing chart of FIG. 5.

Signal 1 of FIG. 5 is the same as signal 1 shown in FIG. 3 except that the former is represented on a more reduced time scale. Signal m is a schematic representation of signal l; the hatched area indicating noise and the open area indicating a photosignal. The hatched areas correspond to pulses l-1, l-2, l-9 and l-10 of FIG. 3. Signals m, o, p and q are sent from the outputs of differential amplifiers 14a to 14d, respectively. When the signals m, o, p and q are summed by the adder comprising resistors 17a to 17e and operational amplifier 18, the hatched noise components cancel each other and produce a signal at the output 19 that contains only a photosignal.

It will be appreciated that the timing of the shift register 8 in the adjacent blocks is such that they are continuous and the group of registers 8 acts as a single shift register. Thus the initial turn-on of the first two transistors in 15B coincides with the second turn-on of 7g and 7h in 15A.

Figure 6:
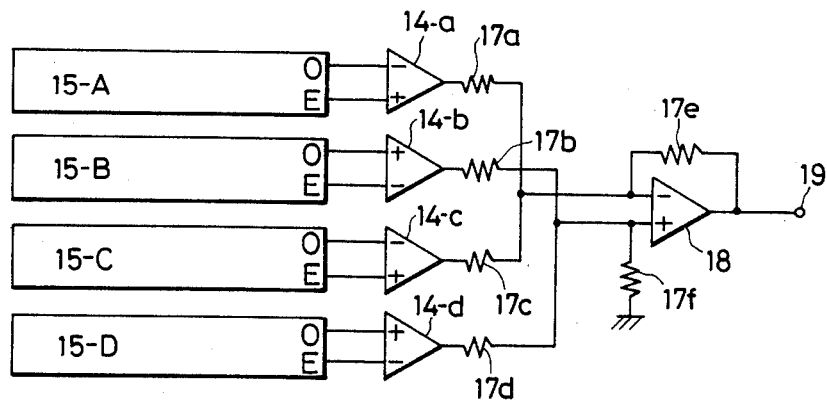
FIG. 6 is another signal processing circuit for the image sensor of the present invention.

Another embodiment of the signal processing circuit used in the image sensor of FIG. 2 is shown in FIG. 6. It differs from FIG. 4 in that the outputs from O and E are connected to the inverting and noninverting inputs, respectively, of differential amplifiers 14-a and 14-c, whereas the same outputs are connected to the noninverting and inverting inputs, respectively, of differential amplifiers 14-b and 14-d. The outputs from the amplifiers 14-a to 14-d are subjected to arithmetic operation by an adder/subtractor circuit comprising resistors 17a to 17f and an operational amplifier 18, and the result is delivered to an output 19.

The sequence of signal processing by the circuit of FIG. 6 is indicated in the timing chart of FIG. 7. Signals s, t, u and v are sent from the outputs of the differential amplifiers 14a to 14d (FIG. 6). A signal $(s+u-t-v)$ produced by performing addition or subtraction on the signals s to v has the hatched noise components cancelled, so the signal w delivered to the output 19 contains only a photosignal.

The MOS transistors 7 and shift register 8 depicted in FIGS. 1 and 2 are fabricated by conventional IC technology using conventional crystalline silicon, but they may be replaced by thin-film transistors formed on a substrate from the same material as that for the thin photoconductive film 3.

Amorphous silicon or polycrystalline silicon is best suited as the photoconductor of the present invention. In FIGS. 2, 4 and 6, the amplifiers 14 and 18 are connected as external components to the image sensor blocks 15A to 15D, but instead, they may be packed on a single IC substrate together with the MOS transistors and shift register.

As will be apparent from the foregoing description, the large-scale image sensor of the present invention is capable of high-speed reading with high S/N ratio, so it permits the use of a low-power illuminating light source. Therefore, the invention has great potential for the fabrication of a small-size, high-speed and low-power consumption original reading device.

I claim:

1. An original reading device of the type having light sensing elements connected to a signal line through MOS transistors, whereby a light sensing element is charged when an MOS to which it is connected is turned on, the charging representing light intensity in said light sensing element and being detected on a signal line, the improvement comprising:

first and second signal lines for connection to a block of said elements via a corresponding number of said MOS transistors to which said elements are respectively connected;

said number of MOS transistors being arranged in alternating groups of at least two MOS transistors per group, said groups being alternately connected to said first and second signal lines such that all MOS transistors in any group are connected to the same signal line and all MOS transistors in the next succeeding group being connected to the other signal line; and a differential amplifier having its inputs fed with the signals on said first and second signal lines.

2. An original reading device as claimed in claim 1 further comprising means for turning on said number of MOS transistors in the following sequence:

all MOS transistors are turned on twice each reading cycle of said reading device, said first turn-on being sequential and said second turn-on being sequential by transistor, the timing between first and second turn-ons being such that the first MOS in each group is first turned on in time with the second turn-on of the first transistor in the preceeding group.

3. An original reading device as claimed in claim 2, further comprising:

additional blocks of said elements connected to additional first and second signal lines via a corresponding number of said MOS transistors, said connections being identical to the connections of said first block of elements to its first and second signal lines;

additional differential amplifiers, each connected to one pair of the additional first and second signal lines; and means for arithmetically combining the outputs of all said differential amplifiers to produce a low noise photosignal output.

4. An original reading device as claimed in claim 3 wherein said means for turning on is connected to all said MOS transistors and turns on all said MOS transistors in said sequence.

* * * * *